Nov. 17, 1931.  J. M. MURRAY ET AL  1,832,317

INDICATOR FOR AUTOMOBILE HEADLIGHTS

Filed Nov. 24, 1930

Inventors
John M. Murray,
Benjamin T. Hoar.

By Lyon & Lyon
Attorneys

Patented Nov. 17, 1931

1,832,317

UNITED STATES PATENT OFFICE

JOHN M. MURRAY AND BENJAMIN P. HOAR, OF LOS ANGELES, CALIFORNIA

INDICATOR FOR AUTOMOBILE HEADLIGHTS

Application filed November 24, 1930. Serial No. 497,803.

This invention relates to an indicator for a headlight of an automobile for indicating to a driver whether the lamp of a headlight is lit.

Heretofore indicators have been produced which project out beyond the headlight casing, but they are sometimes of a form which necessitates taking off portions of the headlight in order to attach them, or they involve the use of an upper projecting housing above the headlight with a rear side opening. It has also been proposed to fasten a reflecting plate in front of the flange of the ring that retains the headlight lens, but such plates generally diffuse the light in reflecting the rays back to the driver of the automobile, and do not directly reflect back the rays that impinge upon the plate from the lamp of the headlight.

The general object of this invention is to produce an indicator of simple construction which can readily be incorporated in or attached to a headlight and which presents a concave reflecting surface located directly on the flange of a headlight that retains the lens and with the concave reflecting surface oriented in such a way as to enable rays thrown onto it by the lamp to be directly reflected rearwardly toward the driver's position.

A further object of the invention is to provide an indicator of this type which can be constructed of a single piece of material and capable of being carried on the headlight flange so that the edge of the reflecting surface is substantially in the plane of the outer face of the flange, avoiding necessity for the use of forwardly projecting arms to carry the reflecting surface.

Further objects of the invention will appear hereinafter.

The invention consists of the novel parts and combination of parts to be described hereinafter, all of which contribute to produce an efficient indicator for automobile headlights.

A preferred embodiment of the invention is described in the following specification, while the broad scope of the invention is pointed out in the appended claims.

Figure 1:
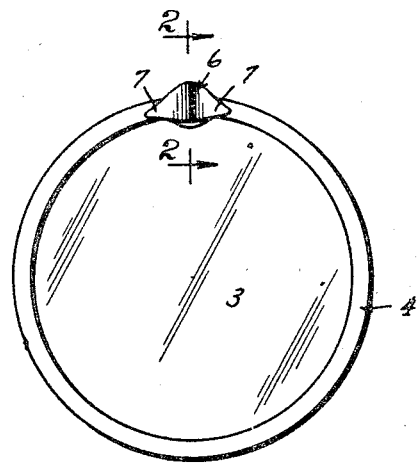
Figure 1 is a front elevation of a headlight illustrating an indicator applied thereto and embodying our invention.
Figure 3:
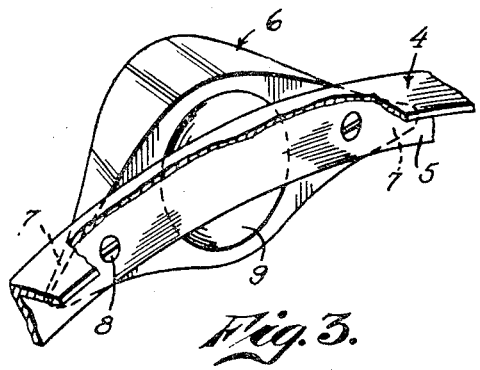
Figure 3 is a perspective of the ring of the headlight broken away and particularly illustrating how the indicator is attached to the same.
Figure 2:
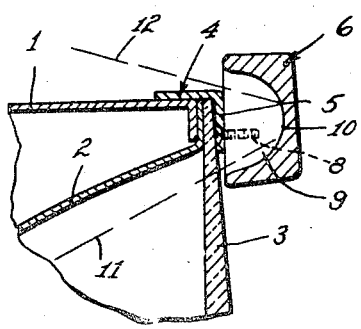
Figure 2 is a vertical section taken about on the line 2—2 of Figure 1 and passing through the indicator and the contiguous portions of the lens and headlight.

In practicing the invention, we provide the headlight with a reflecting surface which is formed on, or attached to, the headlight in such a way that the inner edge of the reflecting surface overhangs the lens of the headlight and projects outwardly beyond the drum or casing of the headlight. In this way, the rays passing from the lamp within the headlight impinge upon the reflecting surface from which they are reflected rearwardly past the outer side of the headlight casing. If the invention is practiced by providing an attachment for the headlight, the body carrying the reflector may be formed out of stamped sheet metal but if desired it may be very conveniently formed of a solid block.

Referring more particularly to the parts, 1 represents the drum or casing of a headlight carrying a reflector 2 and a lens 3, the forward end of the headlight casing being provided with a ring 4 having the usual inwardly projecting flange 5 that engages the edge of the lens to retain it in position.

In applying our invention to such a headlight, we provide an indicator having a body 6 in the form of a metal block which is preferably elongated horizontally so that it presents two laterally projecting ears 7.

Suitable means is provided for securing this body 6 on the ring 4. This is preferably accomplished by providing machine screws 8, the heads of which are located on the inner side of the flange 5.

The indicator is provided with a recess 9 on its inner side which is preferably of cup-form. If desired, the reflecting surface 10 of the recess 9 can be nickel plated to give it high efficiency as a reflector or if desired, the recess can be lined with a cup-shaped reflector set in it.

The body 6 should be attached in position so that the lower edge of the reflecting surface 10 projects inwardly toward the axis of the lamp, thereby overhanging an exposed portion of the lens 3; and the upper portion of the reflecting surface 10 extends above or outwardly beyond the ring 4. In this way, when the lamp within the headlight is lit the rays from it will be reflected as indicated by the dotted lines 11 and 12. In other words, the impinging ray will be reflected from the surface directly back toward the driver's position.

By reason of the fact that the indicator consists of a single piece it can be very rigidly secured to the headlight ring 4 and it is not affected by vibration.

The reflecting surface 10 is preferably a surface of revolution. This facilitates polishing or grinding the surface and if the body of the device is made of a block, the recess can be formed by drilling into the block with a tool or auger having a tip that will give the reflecting surface the desired curved form.

If desired the reflecting surface 10 may be formed by casting the reflector integral with the ring 4. In this case, the ring should be die-cast in order to insure a smooth surface for reflecting.

What we claim is:

1. An indicator for a headlight, consisting of a body carried by the headlight adjacent the edge of the lens, said body having the following shape: a back portion providing a plane surface, a central thickened portion, side portions gradually decreasing in horizontal thickness from said central thickened portion on both sides thereof, the back portions of said side portions being in continuation of the back plane surface of the rear of said central thickened portion, said central thickened portion having at the back thereof a cup shaped reflecting surface and extending into the interior thereof for reflecting rearwardly rays received from said headlight, said thickened portion provided with an upper converted curved top surface extending above the lens of the headlight and a bottom convexedly curved surface extending downwardly and closely adjacent to the headlight lens, and means for fastening said side portions to the headlight.

2. An indicator for a headlight, consisting of a blocklike one piece body carried by the headlight adjacent the edge of the lens, said body having a central portion and side portions, said central portion being of greater thickness than the side portions, said side portions gradually decreasing in horizontal thickness from said central thickened portion on both sides thereof, the back of said side portions being in continuation of the surface forming the back of said central portion, said central thickened portion having a reflecting surface which is hollowed out of said thickened portion and extends into the interior thereof for reflecting rearwardly the rays of said headlight, said thickened portion having upper and lower surfaces which merge into the upper and lower surfaces of said side portions, and means for attaching said side surfaces to a headlight.

Signed at Los Angeles, California, this 18th day of November, 1930.

JOHN M. MURRAY.
BENJAMIN P. HOAR.